United States Patent
Airaksinen

(10) Patent No.: US 6,761,195 B2
(45) Date of Patent: Jul. 13, 2004

(54) ARRANGEMENT IN CONNECTION WITH CIRCULATION LUBRICATION SYSTEM

(75) Inventor: Ari Airaksinen, Syväsalmentie (FI)

(73) Assignee: Safematic Oy, Muurame (FI)

( * ) Notice: Subject to any disclaimer, the term of this patent is extended or adjusted under 35 U.S.C. 154(b) by 0 days.

(21) Appl. No.: 10/311,514

(22) PCT Filed: Jun. 19, 2001

(86) PCT No.: PCT/FI01/00581

§ 371 (c)(1),
(2), (4) Date: Apr. 16, 2003

(87) PCT Pub. No.: WO01/98703

PCT Pub. Date: Dec. 27, 2001

(65) Prior Publication Data

US 2003/0150516 A1 Aug. 14, 2003

(30) Foreign Application Priority Data

Jun. 21, 2000 (FI) .............................. 20001484

(51) Int. Cl.$^7$ ................................ B65B 1/04

(52) U.S. Cl. ........................ 141/198; 141/65; 222/67

(58) Field of Search ................... 141/198, 65, 301, 141/302, 98; 222/64, 65, 67; 184/1.5

(56) References Cited

U.S. PATENT DOCUMENTS

| | | | | |
|---|---|---|---|---|
| 4,193,487 A | * | 3/1980 | Takeuchi | 194/241 |
| 4,420,023 A | | 12/1983 | Cislak | |
| 4,948,010 A | * | 8/1990 | Wiggins | 137/398 |
| 5,816,272 A | * | 10/1998 | Leaphart | 134/102.2 |

* cited by examiner

*Primary Examiner*—Steven O. Douglas
(74) *Attorney, Agent, or Firm*—Pillsbury Winthrop LLP

(57) ABSTRACT

An arrangement in connection with a circulation lubrication system, comprising an intermediate tank, inlet channel means for feeding a lubricant into the intermediate tank, and outlet channel means for removing the lubricant, discharge means for emptying the intermediate tank, and measuring means arranged to start the discharge means when the level of the lubricant rises to an upper limit and to stop the discharge means when the level of the lubricant falls to a lower limit. The discharge means comprise a pneumatic valve, which is opened, when the level of the lubricant is at the upper limit, and to let pressurized air flow into the intermediate tank, whereby the pressurized air pushes the lubricant out of the intermediate tank through the outlet channel means, and prevents the flow of pressurized air into the intermediate tank when the level of the lubricant falls to the lower limit. A counter valve is arranged to prevent the flow of the lubricant out of the intermediate tank into the inlet channel means.

3 Claims, 1 Drawing Sheet

ARRANGEMENT IN CONNECTION WITH CIRCULATION LUBRICATION SYSTEM

Figure 1:
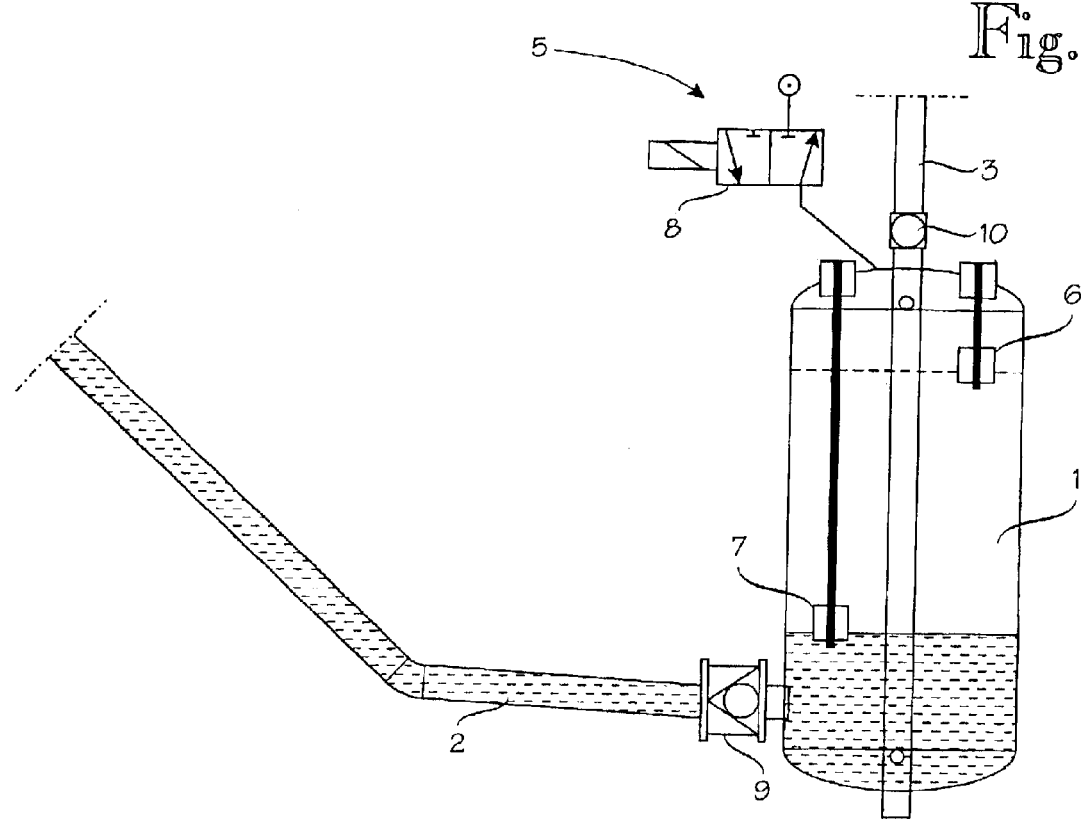

This is a National Stage application of International Application No. PCT/FI01/00581, which was filed on Jun. 19, 2001, and designated the U.S., and was flied in the English language.

The invention relates to an arrangement in connection with a circulation lubrication system, comprising an intermediate tank, inlet channel means for feeding a lubricant into the intermediate tank, and outlet channel means for removing the lubricant from the intermediate tank, discharge means for emptying the intermediate tank, and measuring means arranged to start the discharge means when the level of the lubricant in the intermediate tank rises to a predetermined upper limit and to stop the discharge means when the level of the lubricant in the intermediate tank falls to a predetermined lower limit.

The above arrangements are presently well-known in connection with circulation lubrication systems. The conventional intermediate tank solutions are frequently implemented in such a way that two electric motor driven pumps, for example, are arranged in connection with the tank. The use of the pumps is controlled with starting and stopping liquid level switches. The pump starts when the level of the lubricant in the tank reaches the upper limit functioning as the starting level and stops when the level of the lubricant falls to the lower limit functioning as the stopping level. There are usually two pumps, whereby one of the pumps is in normal operation and the other is an emergency pump in case the pump in normal operation is affected by a failure and cannot empty the intermediate tank. The size of the intermediate tank is typically 100 to 600 liters.

Drawbacks of the conventional intermediate tank solutions include the complexity, and also the size of the tank, which is relatively large. Due to the complexity, the manufacturing costs have been high, and the large size of the apparatus has made its positioning more difficult in industrial premises, which are in many cases rather limited in area.

An object of the invention is to provide an arrangement by means of which the drawbacks of the prior art can be eliminated. This has been achieved by means of the invention. The arrangement according to the invention is characterized in that the discharge means comprise a pneumatic valve arranged to open, controlled by the measuring means, when the level of the lubricant is at the upper limit, and to let pressurized air flow into the intermediate tank, whereby the pressurized air is arranged to push the lubricant out of the intermediate tank through the outlet channel means, and to shut and prevent the flow of pressurized air into the intermediate tank when the level of the lubricant falls to the lower limit, and that a counter valve is arranged in the inlet channel means for the lubricant before the intermediate tank, seen from the direction of flow, the counter valve being arranged to prevent the flow of the lubricant out of the intermediate tank into the inlet channel means.

An advantage of the invention compared with prior art solutions is, above all, that a construction smaller and simpler than previously can be achieved. Thus, the manufacturing costs can be decreased by means of the invention, compared with the prior art, and the positioning of the apparatus in different industrial premises becomes considerably easier, compared with the use of conventional technology.

Figure 2:
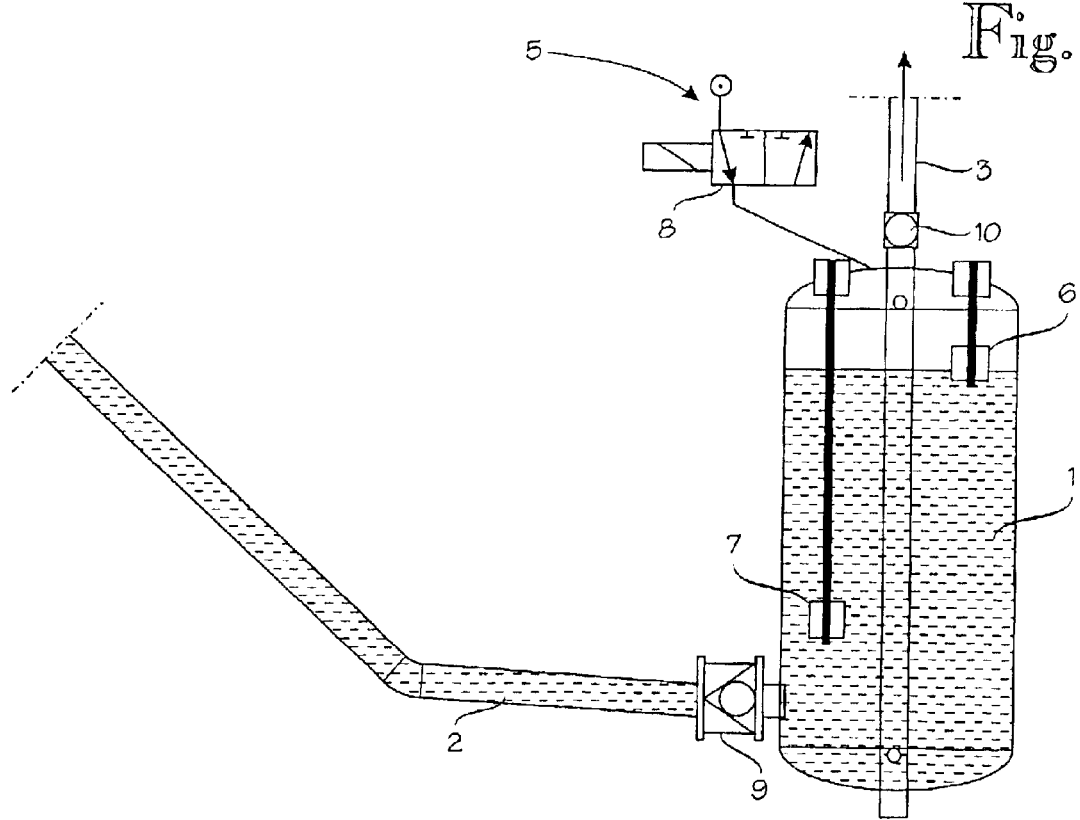

The invention will now be described in greater detail by means of a preferred embodiment of the invention, illustrated in the attached drawing, whereby FIG. 1 shows a principle view of an arrangement according to the invention in a situation where the level of the lubricant in the intermediate tank is at the lower limit; and FIG. 2 shows a principle view of an arrangement according to the invention in a situation where the level of the lubricant in the intermediate tank is at the upper limit.

FIGS. 1 and 2 show a principle view of an arrangement according to the invention in situations where the level of the lubricant in the intermediate tank is at the lower limit and at the upper limit, respectively. The intermediate tank is denoted by reference numeral 1 in the figure. Inlet channel means for feeding a lubricant into the intermediate tank 1 are indicated by reference numeral 2. The inlet channel means 2 can be formed for instance of a tube which is connected to the intermediate tank 1 as illustrated in the figures. Outlet channel means for removing the lubricant from the intermediate tank 1 are denoted by reference numeral 3 in the figures. The outlet channel means 3 can be formed of a tube in the way corresponding to what was presented in connection with the inlet channel means 2.

Discharge means for emptying the intermediate tank 1 are generally denoted by reference numeral 5 in the figure. Reference numerals 6 and 7 in the figures indicate measuring means which are arranged to start the discharge means 5 when the level of the lubricant in the intermediate tank 1 rises to the predetermined upper limit and to stop the discharge means 5 when the level of the lubricant in the intermediate tank 1 falls to the predetermined lower limit.

According to an essential idea of the invention, the discharge means 5 comprise a pneumatic valve 8. The pneumatic valve is connected to an appropriate source of pressurized air. Controlled by the measuring means 6,7, the pneumatic valve 8 is arranged to open when the level of the lubricant is at the upper limit and to let pressurized air flow into the intermediate tank 1, whereby the pressurized air is arranged to push the lubricant out of the intermediate tank 1 through the outlet channels means 3, and correspondingly, to shut and prevent the flow of pressurized air into the intermediate tank 1 when the level of the lubricant falls to the lower limit. The pneumatic valve is at the shutting stage also arranged to open a gas flow channel from the inside space of the intermediate tank 1 to the surroundings, whereby the inside space of the tank can be vented freely. This flow channel can be created in connection with the pneumatic valve or it can be made a separate valve, the opening and shutting of which is controlled by the pneumatic valve. A counter valve 9 is arranged in the inlet channel means 2 for the lubricant, before the intermediate tank 1, seen from the direction of flow, the counter valve 9 being arranged to prevent the flow of the lubricant out of the intermediate tank 1 into the inlet channel means 2. The purpose of the counter valve 9 is thus to ensure that the pressurized air pushes the lubricant out of the intermediate tank specifically through the outlet channel means 3.

FIG. 1 shows in a principled manner a situation where the level of the lubricant in the intermediate tank 1 is at the lower level, whereby the pneumatic valve 8 shuts, opening a connection from the inside of the intermediate tank 1 to the surroundings. FIG. 2, in turn, shows a situation where the level of the lubricant in the intermediate tank is at the upper limit, whereby the pneumatic valve 8 opens, letting pressurized air flow into the inside of the intermediate tank 1.

The outlet channel means 3 are further provided with a second counter valve 10, which is arranged to prevent the flow of the lubricant out of the outlet channel means back into the intermediate tank. The purpose of the second counter valve 10 is thus to ensure that the lubricant pushed by means of the pressurized air into the outlet channel 3 does not flow back into the intermediate tank 1.

The arrangement according to the invention functions in the following way, in principle. The lubricant is conveyed into an intermediate tank 1 of a relatively small size through an inlet channel means 2 provided with a counter valve 9. Hence, the level of the lubricant begins to rise in the intermediate tank. The air in the intermediate tank 1 can flow to the surroundings through the flow channel of the pneumatic valve. At this stage, there is no connection from the source of pressurized air to the intermediate tank, in other words the pneumatic valve is closed. This situation is shown in FIG. 1. When the level of the lubricant rises to the upper limit, the measuring means 6 gives a signal to the pneumatic valve, whereby the pneumatic valve opens and lets pressurized air flow into the inside of the intermediate tank 1, whereby the pressurized air simultaneously pushes the lubricant in the intermediate tank 1 out of the intermediate tank 1 through the outlet channels means. This situation is shown in FIG. 2. When the lubricant flows out of the intermediate tank 1 as a result of the effect of the pressurized air, the level of the lubricant naturally falls in the intermediate tank, and as soon as the level falls to the lower limit, the measuring means 7 gives a signal to the pneumatic valve 8, whereby the pneumatic valve 8 shuts and the situation is again as in FIG. 1, in other words the intermediate tank 1 begins to refill through the inlet channels means 2. The function of the counter valves 9 and 10 is to attend to the flow of the above-described kind.

The embodiments presented above are by no means intended to restrict the invention, but the invention can be varied totally freely within the scope of the claims. Thus, it is obvious that neither the arrangement according to the invention nor its details have to be of exactly the same type as what is shown in the figures, but solutions of other kinds are also feasible.

What is claimed is:

1. An arrangement included in a circulation lubrication system including pressure pipe lines configured to provide oil to at least one part to be lubricated and return pipe lines configured to return oil from at least one part to be lubricated, the arrangement comprising:

an intermediate tank, inlet channel means for feeding a lubricant into the intermediate tank, the inlet channel means being a return pipe line through which oil is returned from the at least one part to be lubricated, outlet channel means for removing the lubricant from the intermediate tank, the outlet channel means being a pressure pipe line leading to the at least one part to be lubricated, discharge means for emptying the intermediate tank, and measuring means arranged to start the discharge means when the level of the lubricant in the intermediate tank rises to a predetermined upper limit and to stop the discharge means when the level of the lubricant in the intermediate tank falls to a predetermined lower limit, wherein the discharge means includes a pneumatic valve arranged to open, controlled by the measuring means, when the level of the lubricant is at the upper limit, and to let pressurized air flow into the intermediate tank, whereby the pressurized air is arranged to push the lubricant out of the intermediate tank through the outlet channel means, and to shut and prevent the flow of pressurized air into the intermediate tank when the level of the lubricant falls to the lower limit, and wherein the arrangement further includes a counter valve which is arranged in the inlet means for the lubricant before the intermediate tank, seen from the direction of flow, the counter valve being arranged to prevent the flow of the lubricant out of the intermediate tank into the inlet channel means.

2. An arrangement according to claim 1, wherein the outlet channel means is further provided with a second counter valve, which is arranged to prevent the flow of the lubricant from the outlet channel means back into the intermediate tank.

3. An arrangement according to claim 1, wherein when shutting, the pneumatic valve is also arranged to open a gas flow channel from the inside space of the intermediate tank to the surroundings.

* * * * *